Patented Dec. 25, 1928.

1,696,507

UNITED STATES PATENT OFFICE.

ERICH MAX ALFRED STHAMER, OF HAMBURG, GERMANY.

FOAM-PRODUCING COMPOSITION.

No Drawing. Application filed March 29, 1928, Serial No. 265,813, and in Germany April 4, 1927.

As a means for creating foam in divers industries, such as producing table luxuries, fire extinguishing means and also in the cosmetic industry as is well known saponin is used. Since the price of saponin is comparatively high it has also been proposed to use additions of cheaper substances, such as dextrine or cane sugar. These substances, however, can only be considered pure attenuants and impair the foam creating quality of the saponin, because the foam which is created by such mixtures is of a large bubble nature, and will sooner collapse than such foam which is created by pure saponin.

This invention now is based on the unexpected discovery that if the saponin is given an addition of milk sugar, this addition has not only the effect of reducing the price of the attenuant but also of improving the formation of foam. By way of example it has been found that a mixture of 80% saponin and 20% of milk sugar next to the reduction of the price of the mixture has also the advantage that the mixture gives a better and more lasting foam than pure saponin. This foam improving effect of the milk sugar addition goes so far that even a good result will be secured which is almost equal to that of pure saponin, if saponin and milk sugar are mixed at a proportion of 17% to 83%. When using the heretofore additions to saponin it was impossible to reduce the amount of saponin down to 60% or 70%. The percentage of 17 of saponin of this special saponin-milk-sugar-mixture signifies an extraordinary reduction of price, though milk-sugar as a rule is more expensive than, for instance, cane-sugar.

Moreover this mixture has the further advantage that it is almost purely white, and therefore as well as for reason of the small amount of saponin is especially adapted for table luxuries. For fire-extinguishing purposes a mixture of 25% saponin and 75% of milk sugar is well adapted.

I claim:

1. Foam producing means consisting of a mixture of saponin and milk sugar.

2. Foam producing means consisting of a mixture of 17% of saponin and 83% of milk sugar.

In testimony whereof I have signed my name to this specification.

ERICH MAX ALFRED STHAMER.